(12) United States Patent
Chuang et al.

(10) Patent No.: US 7,886,303 B2
(45) Date of Patent: Feb. 8, 2011

(54) METHOD FOR DYNAMICALLY ADJUSTING AUDIO DECODING PROCESS

(75) Inventors: Chih-Chiang Chuang, Hsinchu (TW); Pei-Yun Kuo, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 935 days.

(21) Appl. No.: 11/750,363

(22) Filed: May 18, 2007

(65) Prior Publication Data

US 2008/0288261 A1    Nov. 20, 2008

(51) Int. Cl.
G06F 9/46    (2006.01)

(52) U.S. Cl. ............... 718/107; 718/100; 718/102; 704/500; 370/463; 370/465; 370/522; 379/229; 455/561

(58) Field of Classification Search ........... 718/100, 718/107, 102; 704/500–504, 229, 219, 269; 712/35; 710/22; 370/463, 465, 522; 379/229; 455/561
See application file for complete search history.

(56) References Cited

U.S. PATENT DOCUMENTS

| | | | | |
|---|---|---|---|---|
| 5,628,013 A | * | 5/1997 | Anderson et al. | 718/107 |
| 5,630,132 A | * | 5/1997 | Allran et al. | 718/100 |
| 5,680,506 A | * | 10/1997 | Kroon et al. | 704/203 |
| 5,828,881 A | * | 10/1998 | Wang | 719/314 |
| 6,065,131 A | * | 5/2000 | Andrews et al. | 713/600 |
| 6,108,720 A | * | 8/2000 | Tal et al. | 710/20 |
| 6,629,180 B1 | * | 9/2003 | Attimont et al. | 710/262 |
| 6,912,712 B1 | * | 6/2005 | Myung | 718/101 |
| 7,016,412 B1 | | 3/2006 | van Zon | |
| 7,647,067 B2 | * | 1/2010 | Fujioka | 455/550.1 |
| 2003/0008684 A1 | * | 1/2003 | Ferris | 455/561 |
| 2005/0132373 A1 | * | 6/2005 | Fujioka | 718/100 |
| 2007/0005327 A1 | * | 1/2007 | Ferris | 703/14 |
| 2007/0136729 A1 | * | 6/2007 | Neuman | 718/102 |

OTHER PUBLICATIONS

DE Office Action mailed Feb. 28, 2008.
"Adaptation Techniques for Ubiquitous Internet Multimedia" Margaritidis et al.; Wireless Communications and Mobile Computer 2001; 1:141-163 (DOI 10.1002/wcm.10).

* cited by examiner

*Primary Examiner*—Vijay B Chawan
(74) *Attorney, Agent, or Firm*—Thomas, Kayden, Horstemeyer & Risley

(57) ABSTRACT

A method for dynamically arranging DSP tasks. The method comprises receiving an audio bit stream, checking a remaining execution time as the DSP transforms the audio information into spectral information, simplifying the step of transforming the audio information when the DSP detects that the remaining execution time is shorter then a predetermined interval, and skipping one section of the audio information and decoding the remaining section when the execution time is less than a predetermined interval.

19 Claims, 6 Drawing Sheets

US 7,886,303 B2

METHOD FOR DYNAMICALLY ADJUSTING AUDIO DECODING PROCESS

BACKGROUND OF THE INVENTION

Field of the Invention

The invention is related to digital signal processing, specifically, the present invention related to a digital system processing audio decoding.

Typically, a digital signal processor (DSP) services only one interrupt, and at most times, only highest priority interrupt. When no interrupt occurs, the DSP can service any new interrupt. If, however, an interrupt is occurring, the DSP ignores other interrupts and interrupts of lower priority. Others tasks may be suspend or ignored until a higher-priority task is completed. As a result, a lower-priority interrupt might not execute on schedule. FIG. 1 shows a time diagram for a DSP processing a plurality of tasks. Task 1 occurs occasionally, but once a task 1 routine is requested, a succeeding task 1 routine has a high chance of being requested after a time period T1. Task 2 is a task with a priority lower than task 1, and typically requires another time period T2 to finish. In some cases, the task 2 must be done completely in time period T2, or a system error will occur. For example, when the task 2 is an audio decoding task, the user may hear a discontinuity in a melody if the audio decoding task does not finish on time. Because a DSP can only process one task at a time, a hardware conflict is occurs at time to when the DSP is processing task 2 and an interrupt of task 1 is requested.

BRIEF SUMMARY OF THE INVENTION

Accordingly, methods for rearranging DSP tasks are provided. One embodiment a method for rearranging digital signal processor (DSP) tasks dynamically arranging a plurality of tasks, wherein each task is associated with an interrupt and a priority, and one of the tasks is an audio decoding task. The method comprises receiving an audio bit stream, checking a remaining execution time as the DSP transforms the audio information into spectral information, simplifying transforming step when the DSP detects that the remaining execution time is shorter then a predetermined interval, skipping one section of the audio information and decoding the remaining section when the execution time is less than a predetermined interval, and decoding the remaining section when the execution time is less than a predetermined interval.

According to another aspect of the invention, a method for decoding audio information in a predetermined interval is provided. The method comprises receiving audio information, checking a remaining execution time, segmenting the audio information into two sections according to the remaining execution time, and ignoring one section of the audio information and decoding the remaining section when the execution time is less than a predetermined interval.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 1:
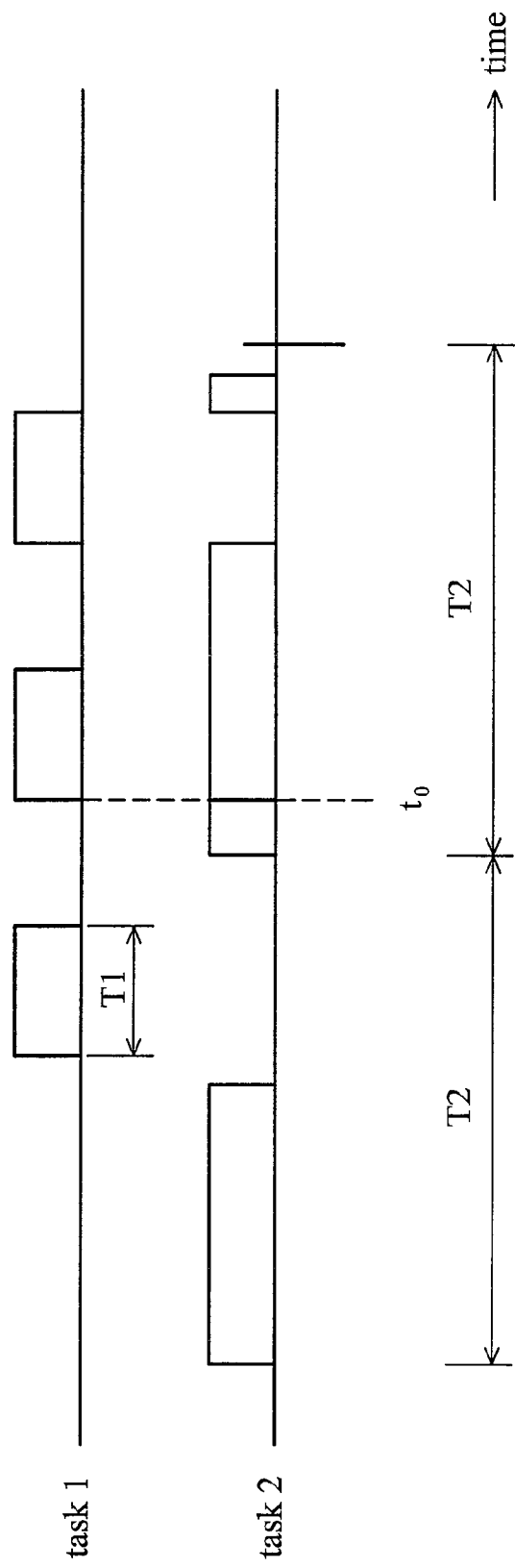
FIG. 1 shows a timing diagram for a DSP processing a plurality of tasks.
Figure 2:
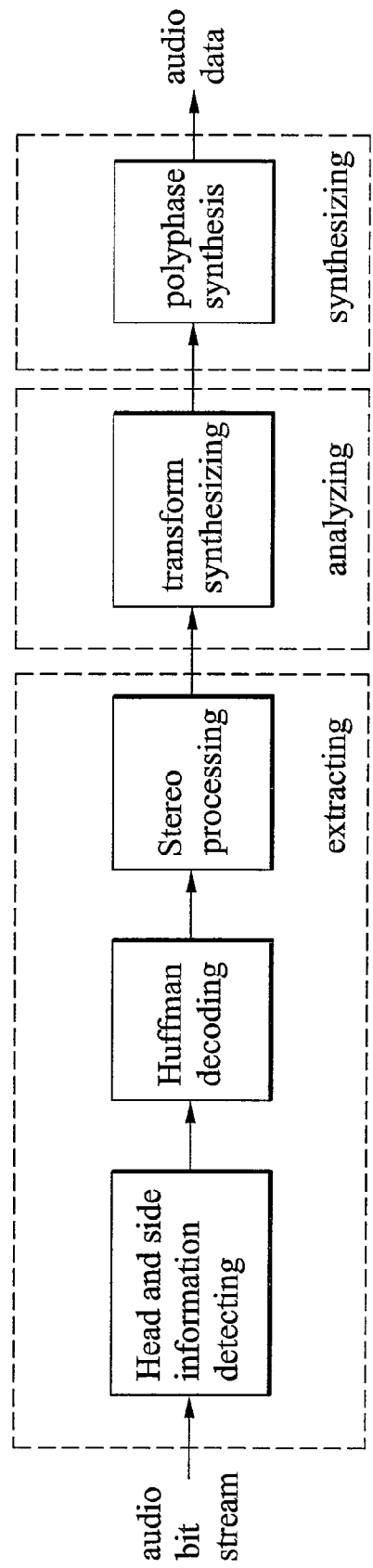
FIG. 2 shows function blocks of decoding an mp3 data.
Figure 3A:
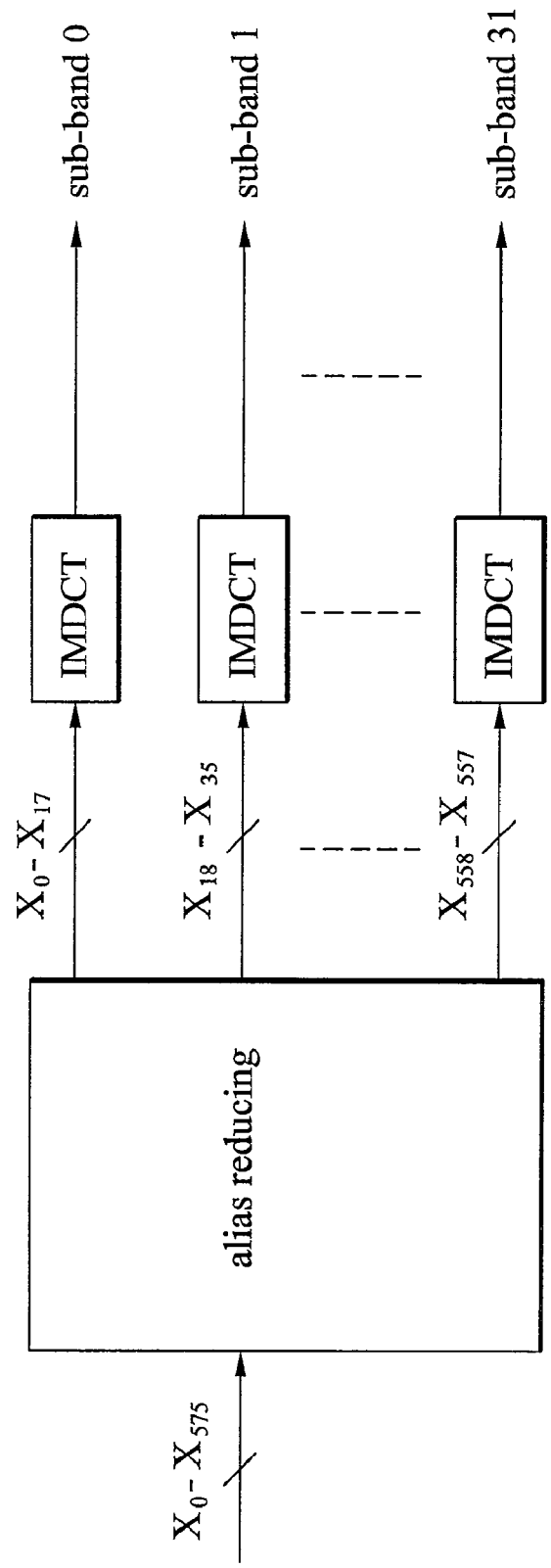
FIG. 3A shows an block diagram of transforming 576 samples into 32 frequency sub-bands.

An audio decoding task may generally be parted into 3 steps including extracting, analyzing, and synthesizing. For ease of explanation, the audio decoding task is described below as applied to the primary mpeg-1 audio layer III (mp3). However, one skilled in the art will recognize that the invention is not limited to mp3 decoding. FIG. 2 shows function blocks of decoding mp3 data. An audio bit-stream is received to extract head and side information, and the audio bit-stream is then Huffman-decoded to generate the first bit stream and stereo-processing the first bit-stream to generate a plurality of samples. The analyzing step may be an inverse-modified-discrete-cosine-transformation (IMDCT) of the plurality of samples to the spectral domain. In this embodiment, the plurality of samples is subject to IMDCT into a plurality of frequency sub-bands. When decoding audio information, a bit-stream with predetermined length must be processed completely in a time frame to avoid a user hearing discontinuous audio. FIG. 3A shows a block diagram of transmuting 576 samples into 32 frequency sub-bands. The step of synthesizing may be polyphase-synthesizing of the plurality of frequency sub-bands.

Figure 4:
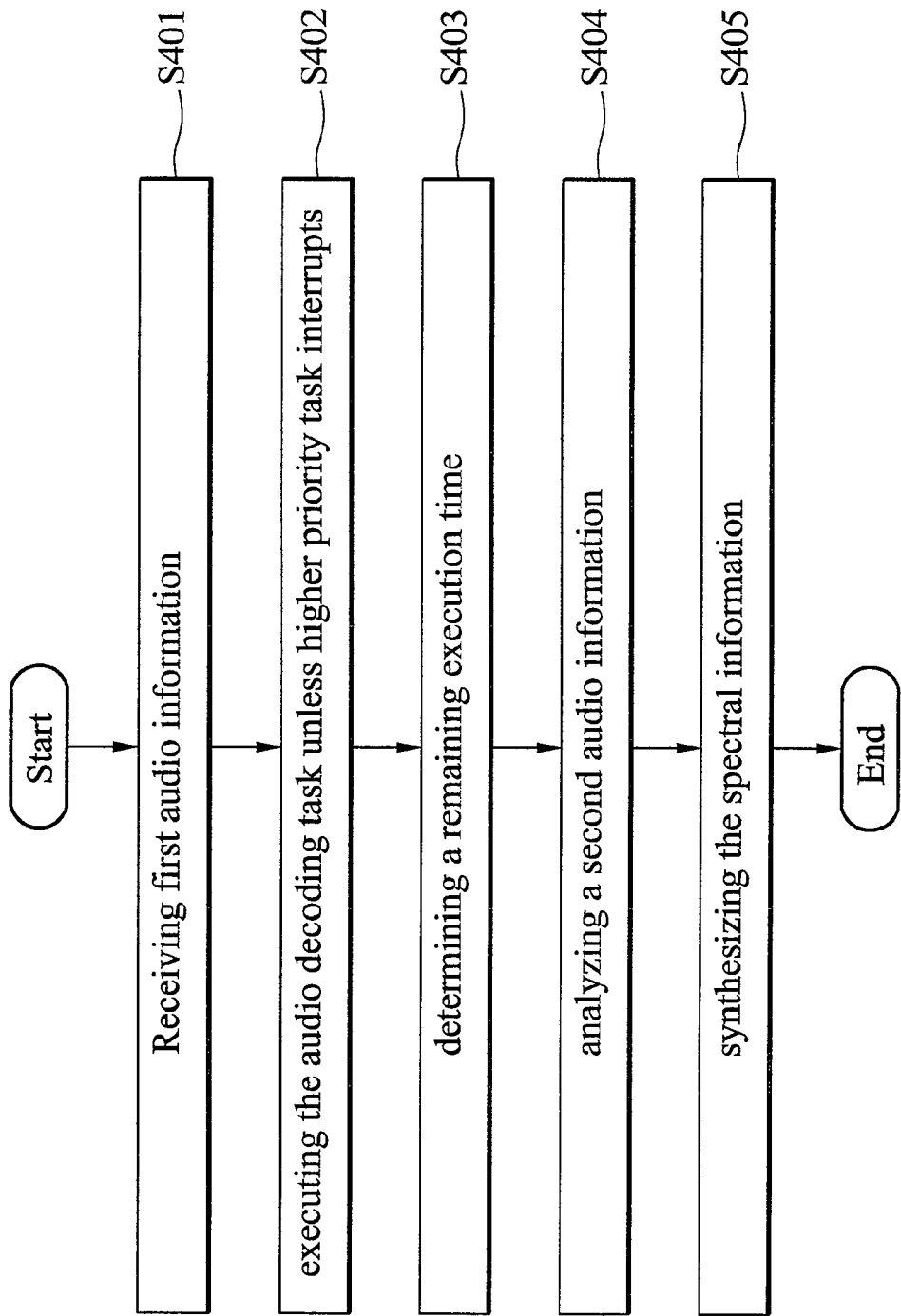
FIG. 4 shows a flowchart of a method for dynamically arranging a plurality of tasks by a DSP.
Figure 5:
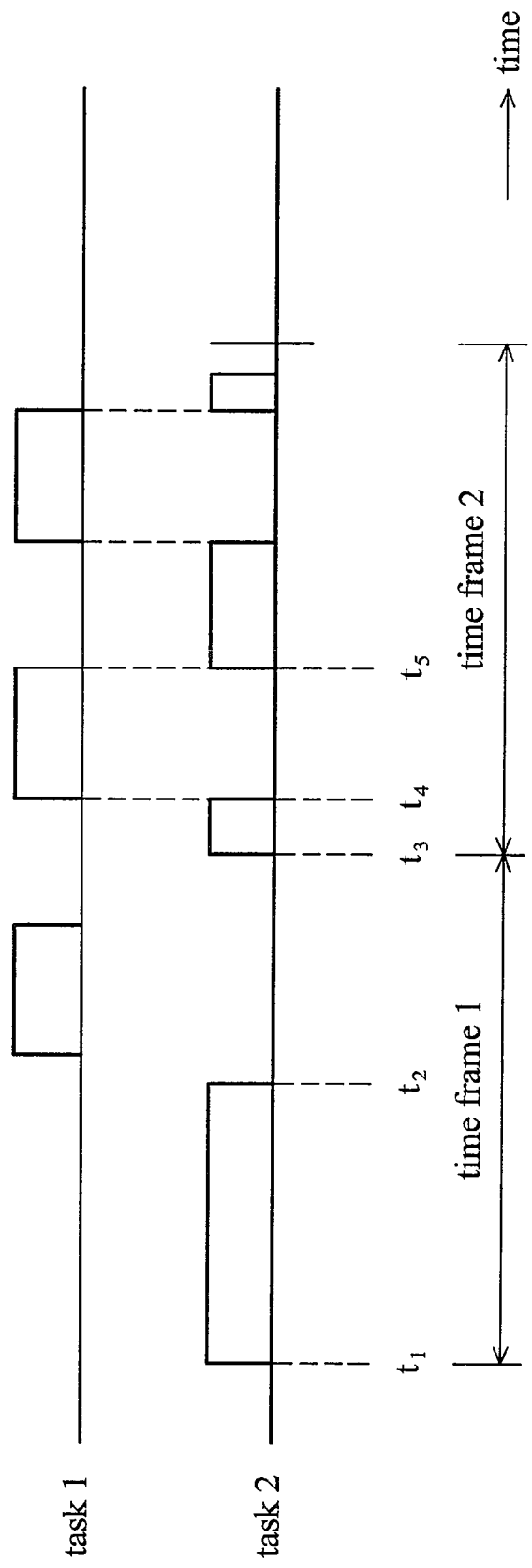
FIG. 5 shows a timing diagram of the DSP scheduling multiple tasks.

FIG. 4 shows a flowchart of a method for dynamical arrangement of a plurality of tasks. In step S401 and S402, the DSP receives audio information and starts to process audio decoding task unless an interrupt from a higher task is received. The audio information may be in a compressed format, such as mp3 format, wma format, ogg format, AAC format, or other formats alike. FIG. 5 illustrates a DSP scheduling multiple tasks. Task 2 represents the audio decoding task, and task 1 may be any other task with higher priority. When no interrupt occurs from time t1 to t2, the audio decoding task is continuously processed until complete, and the task 1 is successfully processed in time frame 1. At time t3, since there isn't any request from task 1, the DSP process task 2. At time t4, a task 1 interrupt request is received, thus, task 2 is suspending, and the first audio information is processed to be second audio information. At time t5, task 1 is complete and the DSP proceeds with an audio decoding task. In step S403, a remaining execution time is determined when the DSP continues to execute task 2. To check the remaining time, a counter is triggered when the DSP begins processing second audio information. A count value which is associated with the counter decreases with time. For example, when the DSP starts to process second audio information at time t5, a counter is also counting how much time is left before time frame 2 is due. In step S404, when the remaining execution time is shorter than a predetermined time interval, the step of analyzing the second audio information is modified. The modified analyzing step comprises segmenting the second audio information into two sections according to the remaining execution time, ignoring one section of the audio information, and analyzing the remaining section. The second audio information, in this embodiment, is spectral information, such as profiles of each frequency sub-band. In some embodiments of the invention, the ignored section is the higher frequency sub-bands, even-numbered sub-bands, or odd-numbered sub-bands. In this embodiment of the invention, the plurality of samples is analyzed into 32 equal-width sub-bands, where the ignored section is the $29^{th}$ sub-band to $32^{th}$ sub-band. In step S405, the analyzed spectral information is synthesized. The ignored sub-band in this embodiment can map to about 18 kHz to 20 kHz, the human ear can rarely hear frequency components above 16 kHz. In other words, low-frequency bands weight more loudly than others, and high-frequency bands are perceptually less important.

Figure 3B:
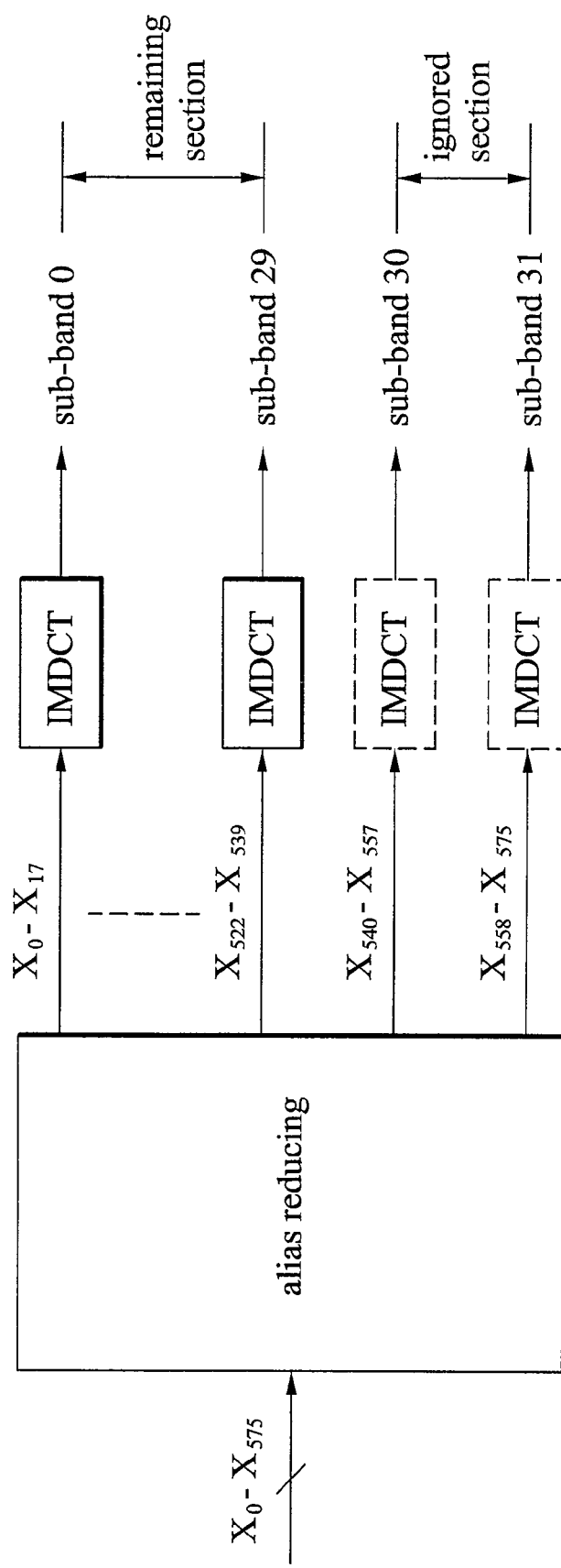
FIG. 3B shows a example of segmenting samples.

In some embodiment of the invention, the audio decoding task can be parted into 3 divisions, extracting a plurality of samples from the bit stream, analyzing the extracted samples to a spectral domain, and synthesizing the spectral samples. The step of extracting may comprise Huffman-decoding of the first bit stream and stereo-processing the Huffman-decoded bit stream to generate 576 samples, $X_0$-$X_{575}$. Huffman-decoding decompresses the bit stream, and stereo processing divides the right and left channels. In other embodiments of the invention, the stereo processing is optional. When analyzing the plurality of samples, a remaining execution time is checked. If the remaining execution time is shorter then a predetermined time interval, the step of analyzing the audio information is modified. To analyze the sample, the plurality of samples may be subject to IMDCT to generate 32 frequency sub-bands. The modifying, for example, segments the 576 samples into two sections, the remaining section includes samples $X_0$-$X_{539}$ and the ignored section includes samples $X_{540}$-$X_{575}$. For example, if the remaining execution time is 3 microseconds and the predetermined time interval is 5 microseconds, samples $X_{540}$-$X_{575}$ are ignored, and only samples $X_0$-$X_{539}$ are IMDCTed to the spectral domain. FIG. 3B shows an example of the segmented samples. The numbers of samples in remain section and ignored section, however, are not limited to 540 and 36. In other embodiment, for example, the remaining execution time is 4 microseconds and the predetermined time interval is 5 microseconds, the remaining section may include samples $X_0$-$X_{503}$ and the ignored section may include samples $X_{504}$-$X_{575}$. The IMDCTed data is further synthesized. In other words, entire frequency sub-bands are synthesized if the remaining execution time exceeds the predetermined time interval, while the remaining section of sub-bands are synthesized when the remaining execution time is less than the predetermined time interval.

As technologies improving, a portable phone now possesses an increasing number of functions. In addition to making or receiving a call, a portable phone may also be a music/video player, a camera, an organizer, etc. In the past, a processing core typically handled those various functions. A DSP which applies the method provided by the invention may have a well-arranged schedule and seems to perform multiple jobs simultaneously.

In this embodiment of the invention, the quality of audio output is varied by the working condition of the DSP. Whenever the DSP is full loaded or under low battery power, the audio decoding task can be rearranged to save system time or power.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamically arranging DSP a plurality of tasks, wherein each task is associated with an interrupt and a priority, comprising:

receiving first audio information;

executing a audio decoding task unless an interrupt having a priority higher than the priority of the audio decoding task interrupts the DSP;

determining a remaining execution time when the DSP transforming the first audio information into second audio information;

segmenting the second audio information into two sections according to the remaining execution time when the remaining execution time is shorter then a predetermined interval, wherein the two sections are a remaining section and ignoring section;

analyzing the remaining section into spectral domain; and synthesizing the analyzed section.

2. The method as claimed in claim 1, wherein determining a remaining execution time comprises triggering a counter when the DSP begins the audio decoding task, and a counter value associating with the counter represents the remaining execution time, wherein the counter value decreases with time.

3. The method as claimed in claim 2, wherein the first audio information is a bit-stream, and the audio decoding task further comprises:

extracting a plurality of samples from the bit-stream; and

Fourier-transforming the plurality of samples into a plurality of frequency sub-bands, and the ignored section is the higher frequency sub-bands.

4. The method as claimed in claim 3, wherein extracting a plurality of samples from the bit-stream comprises:

Huffman-decoding the first bit-stream; and

Stereo-processing the Huffman decoded bit-stream to generate the plurality of samples.

5. The method as claimed in claim 4, wherein the number of the plurality of frequency sub-band is 32.

6. The method as claimed in claim 3, wherein Fourier-transforming the plurality of samples is inverse-modified-discrete-cosine-transforming (IMDCTing) the plurality of samples to generate a plurality of frequency sub-bands, wherein the step of segmenting the second audio information into two sections is segmenting the plurality of samples into two sections, the ignored section and the remaining section.

7. The method as claimed in claim 6, wherein the ignored section is the even numbered of sub-bands instead of the higher frequency of sub-bands.

8. The method as claimed in claim 6, wherein the ignored section is odd numbered of sub-band instead of the higher frequency of sub-bands.

9. The method as claimed in claim 1, wherein the step of synthesizing is polyphase synthesis of the analyzed section.

10. The method as claimed in claim 9, wherein the ignored section is sub-band 29 to sub-band 32.

11. A method of decoding audio information, comprising:

receiving the audio information;

checking a remaining execution time;

segmenting the audio information into two sections according to the remaining execution time; and ignoring one section of the audio information and decoding the remaining section when the remaining execution time is less than a predetermined interval.

12. The method as claimed in claim 11, wherein determining a remaining execution time comprises triggering a counter when the DSP starts the audio decoding task, and a counter value associated with the counter represents the remaining execution time, wherein the counter value decreases with time.

13. The method as claimed in claim 12, wherein the audio information is a bit-stream, and the method further comprises:

extracting a plurality of samples according to the bit-stream; and

Fourier-transforming the plurality of samples into a plurality of frequency sub-bands, and the ignored section are higher frequency sub-bands.

14. The method as claimed in claim 13, wherein extracting a plurality of samples from the bit-stream comprises:

Huffman-decoding the bit-stream; and

Stereo-processing the Huffman decoded bit-stream to generate a plurality of samples.

15. The method as claimed in claim 14, wherein the number of the plurality of frequency sub-bands is 32.

16. The method as claimed in claim 15, wherein the ignored section is sub-band 29 to sub-bands 32.

17. The method as claimed in claim 13, wherein Fourier-transforming the plurality of samples is inverse-modified-discrete-cosine-transforming of the plurality samples to generate a plurality of frequency sub-bands, wherein the step of segmenting the audio information into two sections is segmenting the plurality of samples into two sections, a ignored section and a remaining section.

18. The method as claimed in claim 17, wherein the ignoring section is the even-numbered of sub-bands instead of the higher frequency of sub-bands.

19. The method as claimed in claim 17, wherein the ignored section is the odd-numbered of sub-bands instead of the higher frequency of sub-bands.

* * * * *